March 31, 1970 HANS-HELMUT FELDMANN 3,504,362
DIGITAL ANALOG CONDITION CONTROL DEVICE
Filed June 21, 1966 5 Sheets-Sheet 1

Inventor:
Hans-Helmut Feldmann
BY
Spencer & Kaye
Attorneys

March 31, 1970　　HANS-HELMUT FELDMANN　　3,504,362
DIGITAL ANALOG CONDITION CONTROL DEVICE
Filed June 21, 1966　　　　　　　　　　　　　5 Sheets-Sheet 4

Inventor:
Hans-Helmut Feldmann
BY Spencer & Kaye
Attorneys

Fig. 6

United States Patent Office 3,504,362
Patented Mar. 31, 1970

3,504,362
DIGITAL ANALOG CONDITION CONTROL DEVICE
Hans-Helmut Feldmann, Neu Isenburg, Germany, assignor to Licentia Patent-Verwaltungs-G.m.b.H., Frankfurt am Main, Germany
Filed June 21, 1966, Ser. No. 559,133
Claims priority, application Germany, June 23, 1965, L 50,957; Sept. 16, 1965, L 51,647
Int. Cl. G05b 11/01
U.S. Cl. 340—347                14 Claims

ABSTRACT OF THE DISCLOSURE

A system for controlling the condition of a controlled member driven by an analog feedback control circuit in accordance with a digital deviation signal representing the difference between the actual and desired condition includes a digital analog converter for each controlled member having an analog output for connection to the reference input of the feedback control circuit, a digital input for receiving the deviation signal, an analog power input, said converter having a transfer function between said analog power input and said analog output whose value is proportional to the value of such deviation signal, power supply means connected to the analog power input for supplying a power signal thereto having a first and a second parameter, said power supply means including function generator means for causing said second parameter to vary in proportion to variations of said converter transfer function and, said first parameter to bear a first functional relationship to said transfer function until said transfer function has reached a predetermined value as a result of such digital deviation signal having decreased to a corresponding predetermined level, and said first parameter to thereafter decrease in proportion to further decreases in the value of such digital deviation signal.

---

The present invention relates to control arrangements, and particularly to arrangements of the type employing hybrid ratio regulation.

In hybrid ratio control devices, which are used for controlling the position or the position and velocity, of a moving part, or the relative proportions of ingredients in a mixing operation, for example, position deviation signals which are present in digital form must be converted into analog form in digital-analog converters before they can be applied to the final control elements. The converted analog values of these deviations are generally utilized as the basic, or nominal value, inputs for analog feedback control systems, such as analog velocity feedback control systems, for example. Position control systems of this type may operate basically as simple path controls if the element to be moved, such as a machine tool, is to be given a motion having components which extend along several coordinate axes. In such cases, the velocity components of the element with respect to the individual coordinate axes are made proportional to the position deviation values by controlling, for example, the speeds of driving motors producing the various velocity components. This means that the nominal position values which are fed in by the programming device tend to move the driven part along the shortest path to its desired position.

While it is possible that deviations from the predetermined path may arise due to inaccuracies in the signal level and/or due to varying characteristics of the regulating units, the programmed final position is attained with a high degree of certainty. However, the necessary requirement for such systems is that the programmed digital signals defining selected points along the travel path of the element be sufficiently close together that the number of digits required to define the difference between two successive digital signals does not exceed the number of digit positions available in the digital to analog (D-A) converters, i.e., that the saturation region of the converter characteristics not be reached.

It is a characteristic of known systems of this type that the velocity components of the driven member do not remain constant over the entire travel path since these velocity components are periodically changed in proportion to the deviation of the actual element from the desired position. Therefore, these velocity components continuously decrease, starting from a predetermined maximum velocity down to a zero velocity at a point which coincides substantially with the desired position. This results in a somewhat unsteady motion along the travel path of the element and, on the average, a relatively low average velocity movement either because technological difficulties prevent the predetermined maximum velocity from being as large as desired or because of the saturation characteristics of the control elements being used. Moreover, high accelerations occurring during changes from one speed to another can create an overload in the position feedback control system. In order to obviate at least some of these disadvantages, the incremental digital positioning signals must be chosen so as to have a relatively small difference between successive values.

It is an object of the present invention to overcome these difficulties and drawbacks.

Another object of the present invention is to increase the average driving velocity produced by hybrid ratio regulating systems.

Still another object of the present invention is to provide an improved system of this type employing relatively simple and inexpensive D-A converters.

A yet further object of the present invention is to drive a movable element with respect to one or more coordinate axes at its maximum permissible velocity over substantially its entire travel path.

A yet further object of the present invention is to eliminate the need for additional digital subtraction circuits for obtaining the difference between each successive pair of programmed digital position control signals.

These and other objects according to the present invention are achieved by the provision of a novel hybrid ratio regulating system for controlling the condition of at least one control member driven by an analog feedback control circuit in accordance with a digital deviation signal representing the difference between the actual condition of such member and the desired condition to which such member is to be driven. The system according to the present invention includes one digital-analog converter for each such controlled member, the converter having an analog output for connection to the reference input of such feedback control circuit, a digital input for receiving such digital deviation signal, and an analog power input. The converter is constructed to have a transfer function between its analog power input and its analog output whose value is proportional to the value of such digital deviation signal. Apparatus according to the present invention further includes power supply means connected to the converter analog power input for supplying a power signal thereto having a first parameter and a second parameter. This power supply means includes function generator means for causing the second parameter to vary in proportion to variations of the converter transfer function and for causing the first parameter to bear a first functional relationship to this transfer function until the transfer function has reached a predetermined value as a result of the digital deviation signal having decreased to a corresponding predetermined level. The function generator means also acts to cause the first parameter to thereafter decrease in proportion to further decreases in the value of such digital signal.

According to one embodiment of the present invention, the function generator means act to maintain the first parameter constant until the transfer function has reached the predetermined value and to then cause the second parameter to be maintained substantially constant so as to cause the first parameter to decrease sharply in proportion to further decreases in the value of the digital deviation signal.

According to another feature of the present invention, each controlled member is constituted by a motor which advances a driven element along a respective axis of a coordinate system defining the travel path of such movable element.

According to another application of the present invention, systems of the type described above are employed in mixing operations in which each controlled member is constituted by a motor or other suitable device for regulating the rate at which one ingredient is delivered to a mixing container.

The present invention is intended to be employed in systems in which one or more programmed digital signals are provided on a suitable information storage medium, such as a punched tape for example, for each coordinate axis with respect to which a movable element is to be driven, or for each ingredient to be mixed in a mixing container. When a plurality of digital signals is provided for each coordinate axis or each ingredient, the difference between each adjacent pair of signals is made sufficiently small that the number of digits required to define this difference does not exceed the number of bit locations present in the associated digital-analog converter.

Such systems are also preferably provided with arithmetic units ot which successive ones of this plurality of digital signals are fed, with each succeeding digital signal being fed only after the movable element has been driven to a point relatively close to the position defined by the preceding digital signal. The arithmetic unit to which each digital signal is fed is also connected to receive a periodically variable digital signal representing the actual position of the movable element along the coordinate axis of interest and to produce a digital output, or deviation signal, representing the difference between the programmed signal and the actual position signal. It is this difference signal which is applied to the digital-analog converter. Therefore, the digital condition of the converter is continuously varied in accordance with the relation between the desired position of the element and its actual position.

Additional objects and advantages of the present invention will become apparent upon consideration of the following description when taken in conjunction with the accompaying drawings in which.

Figure 1:
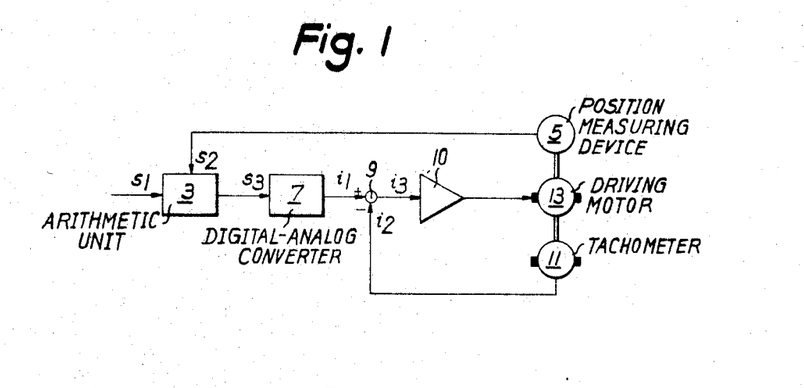
FIGURE 1 is a block diagram of a control system according to the present invention.

Referring now to FIGURE 1, there is shown a control system of the type with which the present invention is to be employed including an arithmetic unit 3 connected to receive either one or a succession of digital signals representing nominal position values $s_1$ for one coordinate axis with respect to which the element is to be moved, these signals being supplied in succession from a suitable program storage device, for example a punched tape reader. Unit 3 is also provided with an input for receiving a signal $s_2$ representing the actual position, with respect to the one coordinate axis, of the element being moved, this signal being provided by a position value measuring device 5. Devise 5 may be constituted, for example, by a measuring instrument of the angular coder type which directly provides a digital position indicating signal. Such angular coders are known per se and have been described, for example, in chapter 3.2, which is entitled "Das Digital-Absolutverfahren und die zugehoerigen Geraete" The Digital-Absolute Technique and the Instruments appertaining thereto) in the book "Die" Numerische Steuerung von Werkzeugmaschinen" (The Numerical Control of Machine Tools) by W. Simon, Carl Hanser Editor, Munich, 1963.

Arithmetic unit 3 measures the difference between the programmed position value $s_1$ and the actual position values $s_2$ and produces a digital output representing the difference between these two values, this output being denoted as the position deviation signal $s_3$. This signal $s_3$ is fed to a digital-analog (D-A) converter 7 which produces an output value, $i_1$ having an amplitude proportional to the value of digital input signals $s_3$.

This signal $i_1$ is supplied as the reference input to a comparator 9 of an analog feedback speed control system. This control system includes a high gain amplifier 10 having its input connected to the output from comparator 9 and having its output connected to supply driving power to a driving motor 13 of the type whose output speed is proportional to the amplitude of the signal applied to its input. The driving motor 13 is connected to drive the movable element parallel to the one axis of the coordinate system. The driving motor 13 is also connected to drive a tachometer 11 which produces an output $i_2$ having an amplitude proportional to the speed of rotation of motor 13. This output $i_2$ is supplied to comparator 9 as the feedback input thereto. As a result, the output $i_3$ from comparator 9 constitutes the error signal for the feedback system and represents the difference between reference input $i_1$ having an amplitude proportional to the desired driving speed of motor 13 and the feedback signals $i_2$ having an amplitude proportional to the actual driving speed of motor 13.

Driving motor 13 may be of any suitable, well-known type and may be constituted, for example, by a servo motor. Amplifier 10 may also be of any suitable, well-known type of high gain amplifier capable of providing sufficient an output to drive motor 13 at the desired speed.

Digital arithmetic unit 3 may be constituted, in the most simple case, of a digital subtraction circuit of the type described in the chapter entitled "Binary Addition and Subtraction," in the text Arithmetic Operations in Digital Computers by R. H. Richards (D. Van Nostrand Co., Inc. 1963).

In most cases, it will be desired to advance the movable element simultaneously with respect to two or three coordinate axes. In such cases, it is necessary to provide one driving motor, analog feedback control system, and digital output measuring device for each coordinate axis. However, in systems according to the present invention, it is only necessary to provide in these cases to provide a single arithmetic unit 3 for all of the analog feedback control systems, provided that the arithmetic unit is arranged to cyclically provide an output to each analog feedback control system in sequence and provided that the digital signals supplied to the arithmetic unit for each coordinate axis are stored therein during each cycle.

Known systems having the general form shown in FIGURE 1 generally employ a digital-analog converter whose analog output $i_1$ is always directly proportional to its digital input $s_3$. When the digital-analog converter has such a characteristic, it is necessary to limit the maximum analog output from the converter in such a manner as to prevent the output of the analog feedback control system amplifier from becoming saturated. In order to produce such a result, it is necessary that the maximum analog output from the digital converter be maintained at a relatively low value, either by applying relatively small digital deviation signal $s_3$ thereto or by constructing the converter so that its maximum analog output has a relatively small value. In either case, this output will decrease as soon as the digital deviation signal applied thereto drops below its maximum value, thereby leading to a decrease in the velocity with which the driving motor is driven, and hence a decrease in the velocity with which the movable element is moved along its programmed travel path.

The requirement that the output current from the analog feedback system amplifier not attain its saturation, or limiting value is due to the fact that the desired velocity ratio between the motors associated with the several coordinate axes can not be maintained constant unless each amplifier output remains proportional to its input. It the amplifier outputs should become saturated, all of the motors would be driven at the same speed, so that the speed ratio between any pair of motors will assume a value of one. This means that the movable element will always be driven at an angle of 45° with respect to each of the coordinate axes, which is generally highly undesirable.

Such an undesirable mode of operation is prevented in embodiments of the present invention by providing power supply circuits for the digital-analog converters which limit their analog outputs to values which will not only prevent the feedback circuit amplifier outputs from reaching saturation, but which will also permit the amplifier outputs to drive their associated motors at their maximum velocity over substantially the entire travel path of the movable element. This may be achieved most simply by providing a power supply for the converters which delivers a power signal having a first parameter whose variation controls the outputs of the feedback system amplifiers, the amplitude of this parameter being limited to a predetermined maximum value regardless of the amplitude of the digital signal $s_3$ supplied to the converter.

According to a more complex form of construction, the maximum value of this parameter may be varied periodically by an additional succession of programmed digital signals whose values are chosen in accordance with the particular requirements imposed by the travel path to be followed by the movable element. For example, if the movable element is to be advanced over a relatively small distance with respect to one coordinate axis, the maximum value of this controlled parameter of the power signal can be made larger than in a case where the movable element is to be driven over a relatively large travel path with respect to the coordinate axis.

When power supply means of the type described above are employed in embodiments of the present invention, the driving motors controlled by the feedback control systems will be driven at a constant, optimum velocity until the movable element reaches a point which is relatively close to the position defined by the digital input signal $s_1$. Thereafter, it is desirable that the rate of advance of the movable element be decreased in a continuous manner as it approaches the desired position. This will assure that the movable element will come to rest precisely at the desired position without experiencing any undesirable overshoot and is achieved, according to the present invention, by constructing the power supply means so that the power which it provides for the digital-analog converters has a first parameter which remains constant until the deviation of the movable element from the desired position decreases to a predetermined value, and a second parameter which is then maintained substantially constant so as to cause the first parameter to decrease in proportion to the further advance of the movable element to the desired position, it being the first parameter which controls the outputs of the feedback control system amplifiers.

In the case where a purely electrical system is employed, this first parameter may be constituted by an electric voltage or current, while the second parameter is constituted by a current or voltage, respectively. Similarly, it is also possible according to the present invention to employ fluid elements for the power generator and the D-A converters, in which case the first parameter will be the fluid pressure or flow rate provided by the generator, and the second parameter will be the flow rate or fluid pressure, respectively.

Figure 2:
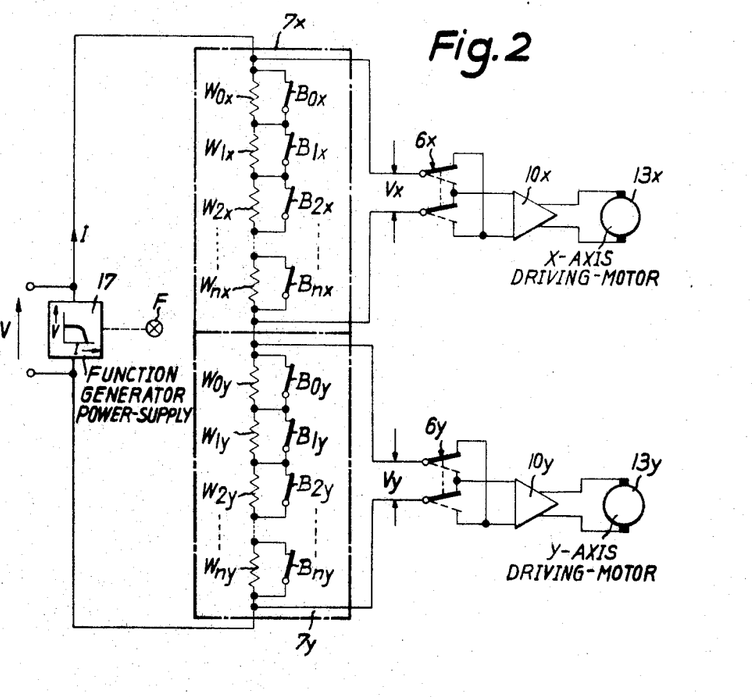
FIGURE 2 is a partly block diagram and partly schematic diagram of one embodiment according to the present invention.

Referring now to FIGURE 2, there is shown an arrangement according to the present invention for moving a movable element with respect to two coordinate axes, one analog feedback control system being provided for movement parallel to each respective coordinate axis. This figure only shows a portion of the entire system including the digital to analog converters $7x$ and $7y$ for each respective coordinate axis and the forward control path for each feedback control system. Each forward control path includes a direction reversing switch $6x$ or $6y$, a high gain voltage amplifier $10x$ or $10y$, and a driving more $13x$ or $13y$. Although only these elements of each feedback control system have been shown for purposes of simplicity, it will be understood that each feedback system further includes one tachometer for each driving motor and one comparator, the output from the tachometer being fed to one comparator input and the output from the comparator being supplied as the voltage $V_x$ or $V_y$ input for its respective high gain amplifier $10x$ or $10y$.

Each of the digital to analog converts $7x$ and $7y$ is constituted by a respective plurality of series connected, weighted resistances $W_{0x}$, $W_{1x}$, $W_{2x}$, . . . $W_{nx}$, and $W_{0y}$, $W_{1y}$, $W_{2y}$, . . . $W_{ny}$. The value of each individual resistance in each digital to analog converter is made proportional to the weighting of the particular digital bit location to which it relates. For example, if the output from the associated arithmetic unit is in binary form, each resistance $W$ will have a value equal to two times the resistance of the next succeeding resistor with which it is connected in series. Each of the resistances $W_{0x}$ . . . $W_{nx}$, is bridged by a respective one of the switches $B_{0x}$, $B_{1x}$, $B_{2x}$, . . . $B_{nx}$. Similarly, each of the resistances $W_{0y}$ . . . $W_{ny}$ is bridged by a respective one of the switches $B_{0y}$, $B_{1y}$, $B_{2y}$, . . . $B_{ny}$. The opening and closing of each of the switches $B$ is controlled by the value of the bit appearing in its respective bit location of a respective one of the digits of the digital position deviation signal $s_3$ for its respective coordinate axis.

Each of the resistances $W_{0x}$ and $W_{0y}$ is associated for example with the $2^0$ bit location of the digital deviation signal $s_3$ for its respective coordinate axis. Similarly, each of the resistances $W_{1x}$ and $W_{1y}$ will be associated with the next lowest bit location, i.e., $2^1$, of its associated position deviation signal and will have a resistance value twice as great as that of resistance $W_{0x}$ and $W_{0y}$, respectively. The resistance values of the remaining resistors $W_2$ to $W_n$ will progressively increase in a similar manner. Each of the switches $B$ is arranged to be placed in an open position when its associated digital bit has a value of L (one) and in a closed position if that bit has a value of zero. As a result, the total effective resistance which the D-A converter presents across the input of its respective amplifier $10$ will be proportional to the analog representation of its respective digital position deviation signal and will decrease as the deviation decreases. Therefore, the voltages $V_x$ and $V_y$ appearing across the outputs of converters $7x$ and $7y$, respectively, will be related to one another in the same manner as the digital deviation signals applied to their respective converters. D-A converters of this type, which are well-known in the art, may be constructed with transistors as the switches B in a manner similar to that described below in connection with FIGURE 3a.

The D-A converters $7x$ and $7y$ are connected together in series across a power supply 17 which includes a function generator producing a voltage vs. current characteristic having the form illustrated by the curve shown in the block representing the power supply. This characteristic is such that the function generator will produce a constant voltage output as long as the current I therethrough remains below a certain value, the voltage output from the function generator dropping sharply after the current I has exceeded this predetermined value. This voltage decrease may be controlled, for example, by means of a suitable threshold detector (not shown) which is connected by way of a separate control input for monitoring the current produced by supply 17.

The voltage V appearing across the output of supply 17 is applied across the series arrangement of the two D-A converters $7x$ and $7y$ and is distributed between the two converters in proportion with the total effective resistance value presented by each converter. This voltage V will thus be equal to the sum of the voltages $V_x$ and $V_y$.

Assuming that there exists a linear relation between the output and input voltages of amplifiers $10x$ and $10y$, and further assuming that the speeds of the driving motors $13x$ and $13y$ are proportional to the output voltages from their respective amplifiers, it will result that the sum of the speeds of the two motors, and hence the sum of the velocity components of the driven movable element will remain constant as long as voltage V remains constant.

The operation of the arrangement of FIGURE 2 is based on the assumption that the difference between successive nominal value digital control signals $s_1$ (FIGURE 1) is sufficiently small that the maximum number of bits appearing in the digital deviation signals $s_3$ exceeds the number of bit positions provided in each of the D-A converters $7x$ and $7y$.

At the start of operation, a signal representing the desired, or nominal, position value for each coordinate axis is fed to the arithmetic unit 3 (FIGURE 1) and the digital position signal for each coordinate is then conducted to a respective one of the D-A converters $7x$ and $7y$. The resulting output voltages from the converters are supplied to amplifiers $10x$ and $10y$, respectively, so as to cause driving motors $13x$ and $13y$ to begin to advance the movable element toward the desired position. As the driven element moves along its travel path, digital signals representing its actual position will be generated in the position measuring device 5 associated with each coordinate axis and will be sent as a digital signal to arithmetic unit 3. This causes the value of the digital output from unit 3 for each coordinate axis to be continuously reduced, thereby causing the total effective resistance of each D-A converter to be reduced by a corresponding amount. However, because the total voltage across the two D-A converters must remain constant, the sum of the voltages $V_x$ and $V_y$ will remain constant, thereby preventing any substantial reduction in the rate of rotation of motors $13x$ and $13y$, and hence in the rate of advance of the movable element.

The system continues to operate in this manner until the current I from power supply 17 exceeds the previously-mentioned predetermined value. With the voltage output across the power supply remaining constant, this predetermined current value will be attained when the total resistance of the two D-A converters has decreased to a certain level. Thereafter, further decreases in this resistance will lead to a sharp decrease in the voltage V with substantially no attendant increase in the current I, this being achieved, as has been mentioned above, either by the automatic operation of the function generator in power supply 17 itself or by means of a separate current monitoring device connected to control the voltage output from the supply 17.

Since the current I is maintained substantially constant, or is permitted to increase only slightly, after its predetermined maximum value has been reached, the voltage across the converters $7x$ and $7y$ will begin to decrease in proportion to further decreases in the series resistances presented by these converters, i.e., in proportion to decreases in the value of the digital position deviation signals $s_3$. As a result, the voltages $V_x$ and $V_y$ will also decrease in proportion with the decrease in these digital position deviation signals. It thus results that the control applied to the movable member being advanced by motors $13x$ and $13y$ changes from a speed control to a position control. The V vs. I characteristic of the function generator in supply 17 and the value of the maximum current produced by the function generator are chosen in such a manner as to prevent the occurrence of overshoots in the movement of the movable element to the position defined by signals $s_1$.

The position defined by the original position control signals $s_1$ may be the final desired position for the movable element or it may be an intermediate position along a programmed path defined by a succession of digital position signals $s_1$. When this latter situation exists, it is desirable to cause the movable element to be driven in a continuous manner at a speed which remains as constant as possible. This can be achieved if the next succeeding programmed digital position signals $s_1$, or the next succeeding pair of signals in the case of two coordinate motion, is fed into the arithmetic unit 3 so as to replace the previous programmed position signal during the time interval between the instant when the current output from supply 17 reaches its maximum value and the instant when the moving element would reach the previously programmed position.

In order to permit the maximum velocity with which the movable element is driven to be properly adjusted, the level of the constant output voltage V from supply 17 may be readily varied by means of a manual control knob F, for example.

The positions of the direction changing switches $6x$ and $6y$ are preferably controlled, in a well-known manner, by the sign of the digital position deviation signal $s_3$, relating to the respective coordinate axis of motion of the movable element.

The optimum speeds with which the movable element is to be advanced along a path having a specific inclination may also be controlled by the information contained on a suitable information carrier, such as a punched tape for example. This information may be stored together with the digital signals representing the various nominal position values in order to provide a regulation of the maximum amplitude of voltage V. As a result of this procedure, the velocity with which the movable element is driven may be selected in advance in order to produce an optimum operation for each particular situation.

Figure 2A:
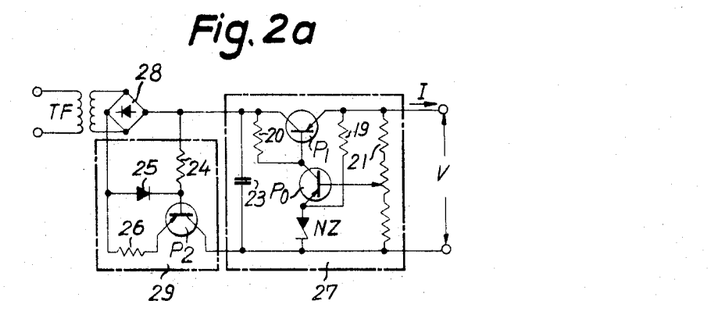
FIGURE 2a is a circuit diagram of one element of the arrangement of FIGURE 2.

FIGURE 2a shows a circuit diagram of one embodiment of the power supply 17 of FIGURE 2. The circuit illustrated is capable of producing the desired V vs. I waveform across its output terminals, which appear at the right in FIGURE 2a. The maximum voltage level stabilization is achieved by the circuit portion 27 which includes a Zener diode NZ having one end connected to the emitter of a first transistor $P_0$ and its other end connected to one output terminal of the power supply. The circuit further includes a second transistor $P_1$ having its base connected to the collector of resistor $P_0$ and its emitter connected to the other output terminal of the supply. The emitters of the two transistors are connected together by a first resistance 19, and a second resistance 20 is connected between the collector and base of transistor $P_1$. A tapped resistance 21 is connected between the output terminals of the supply and has its movable tap connected to the base of transistor $P_0$ for permitting a predetermined fraction of the output voltage to be applied to the base of this transistor. This circuit portion is completed by a storage capacitor connected between the collector of transistor $P_1$ and that output terminal of the supply to which one side of diode NZ is connected.

The circuit portion 29 serves as a current limiter and includes a transistor $P_2$ having its collector connected to one output terminal of the supply and its emitter connected to one end of a resistor 26. There is also provided a diode 25 having its anode connected to the other end of resistor 26 and its cathode connected to the base of transistor $P_2$. Also connected to the base of transistor $P_2$ is one end of resistor 24. The supply further includes a power input transformer TF having its secondary connected across a rectifier 28. The output of rectifier 28 is connected between the other end of resistor 24 and the anode of diode 25.

The output from rectifier 28 is applied across the collector-emitter circuit of transistor $P_2$ and thus produces a voltage drop across the base-emitter circuit of this transistor. When this voltage drop reaches a predetermined value, the transistor $P_2$ is rendered nonconductive and thus limits the current output from rectifier 28 to a predetermined maximum value.

Transistor $P_0$ is connected to monitor the voltage appearing across resistor 21 and hence across the power supply output. The voltage applied to the base of this transistor acts to control the current through Zener diode NZ so as to maintain the voltage V at a constant level until the current output I from the supply exceeds a predetermined value. Transistor $P_0$ also acts to control transistor $P_1$ which serves as a current regulating element. Thus, as long as the current I remains below a predetermined limiting value, the voltage applied to the base of transistor $P_0$ will act to regulate the current level through the transistor $P_1$ in such a manner as to maintain the voltage V constant.

However, when the current I exceeds a predetermined value, the resulting voltage produced at the base of transistor $P_2$ will reduce the current which can flow through the collector-emitter circuit of this transistor so as to prevent the current I from exceeding this predetermined value. Then, as the impedance presented by the D-A converters across the output terminals of the power supply further decreases, the current I will remain substantially constant and the voltage V will drop sharply since the current through Zener diode NZ will no longer be sufficient to maintain this diode in its reverse breakdown region.

The value of the constant voltage produced by the power supply can be regulated by adjusting the position of the movable tap of resistor 21, for example.

Although FIGURE 2 has been described in terms of purely electrical components, embodiments of the present invention are not limited to this form of construction. More specifically, it is contemplated that at least some of the units of embodiments according to the present invention can be constructed in the form of fluid devices.

For example, according to one embodiment of the present invention, the D-A converters of FIGURE 2 can be constituted by a plurality of serially connected fluid impedances $W_{0x}$, $W_{1x}$, $W_{2x}$, ... $W_{nx}$, and $W_{0y}$, and $W_{1y}$, $W_{2y}$, ... $W_{ny}$ in which case the resistance symbols employed in FIGURE 2 constitute the electrical analogies of these fluid impedances, such a use of symbols being generally accepted in cases where the fluid elements are of a well-known type, such as is the case here.

Each of the switches $B_{0x}$, $B_{1x}$, $B_{2x}$, ... $B_{nx}$, and $B_{0y}$, $B_{1y}$, $B_{2y}$, ... $B_{ny}$ is then constituted by a fluid bypass switch which is selectively opened or closed by the digital signal appearing in the bit location with which it is associated. When the switch is opened, the fluid impedance across which it is connected will be effective in the series circuit, while the closing of this switch will cause the impedance to be bypassed and thus to be effectively removed from the series circuit. It thus results that for a given fluid flow I the pressure drop $V_x$ or $V_y$ across each D-A converter will be proportional to the total impedance value of the fluid impedances which are effectively connected in the series circuit.

In this embodiment, the power supply 17 will be constituted by a fluid source producing a fluid flow I at a pressure V and the variations imposed on the flow and pressure will be identical with the previously-described variations in the voltage V and current I in the electrical embodiment.

The fluid employed may be a gas, such as compressed air, for example, which has the advantage of presenting relatively few sealing problems. However, in those cases where the compressibility of a gas creates undesirable influences, or where relatively high pressure output signals are required, a fluid, which is preferably constituted by hydraulic oil, may be used. In some cases water may also be a suitable fluid, particularly where the structural elements are made from a suitable synthetic material.

The use of D-A converters of the fluid type is particularly advantageous in cases where it is desired to employ feedback control systems which are also of the fluid type, i.e., either pneumatic or hydraulic. If required, the analog output signals from the D-A converters may be further amplified by suitable pneumatic or hydraulic amplifiers.

Logic elements and amplifiers utilizing fluids and operating in combination with control systems according to the present invention are well known per se and their specific form of construction does not form a part of the present invention. Such elements have been described in detail, for example, on pages 57 to 64 of the February 1964 issue of the publication "Control Engineering."

In those cases where the digital deviation signals $s_3$ are present in electrical form, the switchable bypasses B are preferably constituted by electrically switchable elements. Such elements are well known in the art.

It is also possible to provide digital systems which produce digital deviation signals in pneumatic or hydraulic form. In such cases, the switches B may be constituted by fluid operated elements of the type in which the control of an output fluid jet is effected directly by means of a fluid control jet. Controls of this type may suitably be constituted by wall jet amplifiers or aerodynamic amplifiers. It is also possible to utilize turbulence or vortex chamber amplifiers for this purpose. All of these latter elements have the additional advantage that they produce output signals which are considerably more powerful than the control signals.

It is also possible to employ a fluid power supply and fluid D-A converters in conjunction with electrical feedback control systems. In this case, it is only necessary to provide a pressure-voltage transducer across each D-A converter and to apply the voltage produced by this transducer as the reference input to the associated feedback control system.

Figure 5:
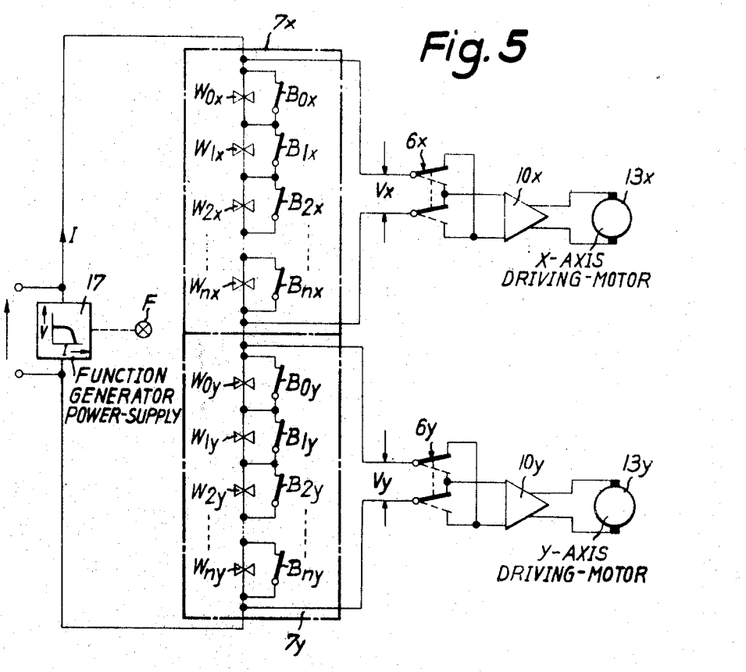
FIGURE 5 is a diagram analogous to that of FIGURE 2 operating with fluid elements.

In FIGURE 5 there is shown an arrangement according to the present invention quite similar to the arrangement shown in FIGURE 2 but operating with fluid elements and driven by a fluid power supply.

In this embodiment, the power supply 17 represents a fluid source producing a fluid flow I at a pressure V with a certain characteristic. The fluid impedance $W_{0x}$, $W_{1x}$, $W_{2x}$ ... $W_{nx}$, and $W_{0y}$, $W_{1y}$, $W_{2y}$ ... $W_{ny}$ are bridged by switches $B_{0x}$, $B_{1x}$, $B_{2x}$ ... $B_{nx}$, and $B_{0y}$, $B_{1y}$, $B_{2y}$ ... $B_{ny}$ for causing fluid to bypass certain impedances according to a programmed digital value. The resulting fluid pressures $V_x$ and $V_y$ may then drive, amplified by the fluid amplifiers 10x and 10y are also not amplified, the fluid motors 13x and 13y. With the switches 6x and 6y the direction of movement of the driving motors 13x and 13y may be reversed.

Figure 3:
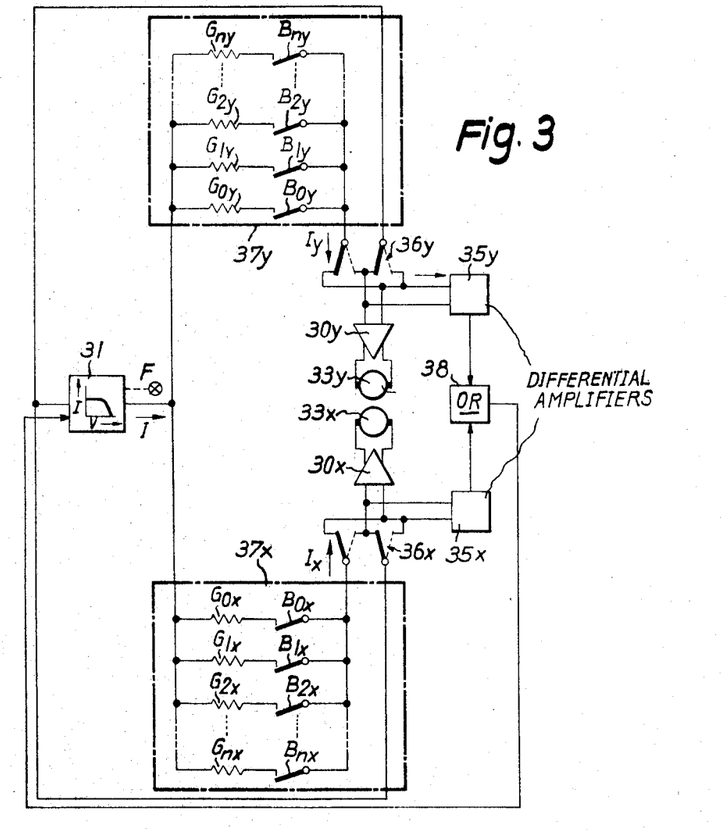
FIGURE 3 is a diagram similar to that of FIGURE 2 of another embodiment according to the present invention.

Referring now to FIGURE 3, there is shown another embodiment of a two-coordinate control system according to the present invention employing two D-A converters 37x and 37y each having a conductance which varies in proportion to the digital position deviation signal $s_3$ applied thereto and a power supply 31 containing a function generator which produces a current vs. voltage characteristic having the form illustrated by the curve enclosed within the block representing the function generator. The current I produced by the power supply maintains a constant level until the voltage V thereacross reaches a predetermined maximum value, after which the current I drops sharply. The level of the constant current output I may be suitably regulated by the adjustment of an electrical or mechanical control F. Converter 37x is constituted by a plurality of parallel resistances $G_{0x}$, $G_{1x}$, $G_{2x}$, ... $G_{nx}$, each connected in series with a respective one of the switches $B_{0x}$, $B_{1x}$, $B_{2x}$, ... $B_{nx}$. Each of these switches is associated with a respective bit of the digital deviation signal $s_3$ associated with the x coordinate axis of the path along which the movable element is advanced. The conductances of resistors $G_{ox}$ to $G_{nx}$ are selected to be proportional to the bit position with which they are associated. Thus, for example, the conductance of resistor $G_{1x}$ will be twice as large as that of the resistor $G_{0x}$, and so on. The position of each of the switches $B_{0x}$ to $B_{nx}$ is controlled by the binary value of the bit to which it relates, each switch being opened when its associated bit has a value of 0 and closed when its associated bit has a value of 1. As a result, the total conductance of the converter 37x will decrease, i.e., its resistance will increase, as the value of its associated digital deviation signal $s_3$ decreases, the resistance reaching a maximum when the digital signal represents a 0 position deviation. The resistances $G_{0y}$, $G_{1y}$, $G_{2y}$, ... $G_{ny}$ and the switches $B_{0y}$, $B_{1y}$, $B_{2y}$, ... $B_{ny}$ of D-A converter 37y are arranged in the same manner.

The output of each D-A converter is connected in series with the input of a respective one of the current amplifiers 30x and 30y through the intermediary of a respective one of the polarity reversing switches 36x and 36y. The position of these switches is controlled by the sign of the digital deviation signal $s_3$ associated with the same coordinate axis.

It may thus be seen that the value of each of the currents $I_x$ and $I_y$ will be directly proportional to the value of the digital deviation signal associated therewith and that the sum of these two currents will remain constant as long as the voltage across power supply 31 remains below its predetermined maximum value.

The D-A converters 37x and 37y are connected together in parallel across the output of power supply 31. As the total resistance of these two converters increases as a result of a decrease in the values of the digital deviation signals associated therewith, the voltage across supply 31 will increase in order to maintain the current I constant. When the parallel resistance presented by the two converters exceeds a certain value, the voltage across supply 31 will reach its predetermined value, and the current I will decrease sharply. As a result, the current applied to each of the amplifiers 30x and 30y will begin to decrease in proportion to the decrease in the value of the digital deviation signals and the control of motors 33x and 33y will go from a speed control to a position control in a manner similar to that described above in connection with FIGURE 2.

Since the amplifiers 30x and 30y are current amplifiers, they have relatively small input resistances.

Each of these current amplifiers is connected in a feedback control system to drive a respective one of the current responsive servo motors 33x and 33y. Current amplifiers of this type are well-known in the art and their connection to the outputs of D-A converters has been described, for example, in the text "Taschenbuch der Nachrichtenverarbeitung" (Handbook of Data processing) by K. Steinbuch, Springer Editor, Berlin, Goettingen, Heidelberg, 1962, pp. 771 and 772, or in German Patent 1,153,078.

To the output of each of the motors 33x and 33y is connected a speed transducer in a manner similar to that shown in FIGURE 1, of the type providing an output current proportional to motor speed, the output of each transducer being employed as a feedback signal, also in a manner similar to that illustrated in FIGURE 1, so as to maintain the speed of each motor proportional to the amplitude of the input current $I_x$ or $I_y$ to its respective amplifier.

The amplifiers 30x and 30y are preferably constituted by current amplifiers having a high transconductance which permits the movable element to be driven in any one of the four quadrants of the X–Y coordinate system defining its motion. Such amplifiers thus serve both as current source and input resistances for their respective servo motors. Amplifiers of this type are well-known per se and are described, for example, in German Patent No. 1,153,078.

The D-A converters 37x and 37y are both fed from the current source 31 which provides a constant current output until the voltage across this source exceeds a predetermined value. This current is distributed between the two converters in proportion to the ratio of the effective resistances of the converters, and hence in proportion to the ratio of the values of the digital position deviation signals $s_3$ acting on the two converters. In addition, the total current $I_x+I_y$ will remain constant and equal to the current I as long as the current output from the function generator 31 remains constant.

As the movable element is driven toward its desired position, as defined by the digital input signals $s_1$, the effective resistances of the two D-A converters will be increased in proportion to decreases in the deviation of the movable element from this desired position. This will cause the voltage across the function generator 31 to increase at a similar rate.

The function generator of power supply 31 is constructed in such a manner or the supply is provided with a suitable external voltage monitoring unit, to assure that the voltage there-across does not exceed a predetermined maximum value. Once this maximum value is attained, the current I will begin to decrease sharply in proportion to further increases in the effective resistances of the D-A converters, thus causing the outputs from these converters to begin to produce a position regulation rather than the speed regulation which they previously effected. The maximum advance speeds produced by the currents applied to amplifiers 30x and 30y may be adjusted by means of a suitable control F connected to function generator 31. The adjustment of control F may be commanded by a suitable programmed signal. This program may, for example, be carried by the same information storage means on which the nominal position values $s_1$ are stored for the purpose of achieving optimum path velocities of the movable element. This procedure may be followed, for example, in order to adapt this maximum speed to the inclination of the travel path of the movable element with respect to its coordinate axes. A system for controlling the amplitude of current I in accordance with a digital program will be described below in connection with FIGURE 3a.

It may occur in the case of current controlled amplifiers, that the amplifiers 30x and 30y are subject to saturation in their outputs if their output currents reach a predetermined level, this type of characteristic being provided in order to prevent the motors 33x and 33y from being overloaded at those times when a maximum digital deviation signal is present. If such amplifiers should become saturated, the result will be that the speeds of the motors, and more significantly the ratio of their speeds, will deviate from the desired values. This may occur particularly during the starting of the motors.

This undesired effect is eliminated, according to a further feature of the present invention, by the provision of a monitoring circuit which includes the differential amplifiers $35x$ and $35y$ each having its input connected to the input of a respective one of the amplifiers $30x$ and $30y$. The outputs of the amplifiers $35x$ and $35y$ are each connected to a respective input of an OR-gate 38 whose output is connected to vary the level of the current I produced by power supply 31.

The amplifiers $35x$ and $35y$ each operate to produce an output signal whenever the voltage across the input of its associated amplifier $30x$ and $30y$ rises sharply, which will occur whenever the output current from either of the latter amplifiers reaches the saturation value. This sudden voltage increase occurs due to the fact that at saturation the transconductance of the amplifier $30x$ or $30y$ ceases to increase, causing the input impedance of this amplifier to suddenly increase.

Amplifiers $35x$ and $35y$ may suitably be constituted by operational amplifiers of the type having a high input impedance and producing an output signal whenever the input voltage thereon experiences a rapid variation. Such operational amplifiers have been described, for example, in the text entitled "Taschenbuch der Nachrichtenverarbeitung" (Handbook of Data Processing) by K. Steinbuch, Springer Editor, Berlin, Goettingen, Heidelberg, 1962, in section 10.3.3 (pp. 1162 ff.).

Whenever a sudden increase in the voltage applied to either of the operational amplifiers $35x$ or $35y$ produces an output pulse, an output will be generated in the OR-gate 38. This output will be applied to power supply 31 in such a manner as to reduce the level of the current I produced thereby to a value which is sufficiently low to prevent the amplifiers $30x$ and $30y$ from remaining saturated. In order to obtain maximum travel velocities for the movable element being driven by motors $33x$ and $33y$, the current output from generator 31 is preferably reduced by only a small amount sufficient to avoid saturation and yet to produce maximum motor speeds. The circuit 37 may be used to switch a current limiting resistor into the power supply output.

Arrangements of the type shown in FIGURE 3 can also be constructed of fluid components in a manner identical with that described above in connection with FIGURE 2. Here again, each of the D-A converter resistances G will be constituted by a fluid impedance having a suitable impedance value and each of the switches B will be constituted by a suitable selectively blockable fluid flow element. Similarly, power supply 31 will be constituted by a fluid supply producing a flow I at a pressure V. As the number of fluid impedances which is effective in parallel in each D-A circuit decreases, the pressure V at the output of generator 31 will have to increase in order to maintain the flow rate I constant. When this pressure reaches the maximum predetermined value, the power supply will sharply reduce any further pressure increases, thus leading to a progressive decrease in the flow rate I. All of the fluid elements in such an arrangement are identical with those described above in connection with FIGURE 2.

Figure 6:
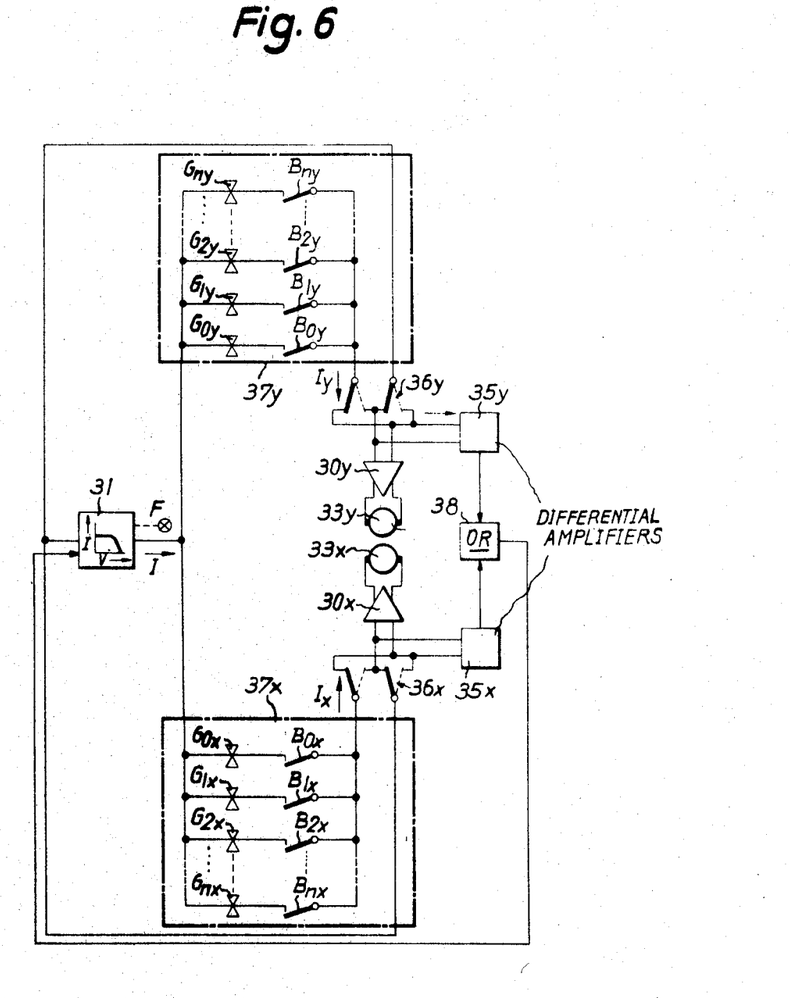
FIGURE 6 is a diagram analogous to that of FIGURE 3, operating with fluid elements.

Such an embodiment shows the FIGURE 6. It is the dual arrangement from this, which is shown in FIGURE 5 and described before. The additional elements, the differential amplifiers $35x$ and $35y$ and the OR- element 38 may be realized in the well known matter, as described in the before mentioned issue of the publication "Control Engineering."

Figure 3A:
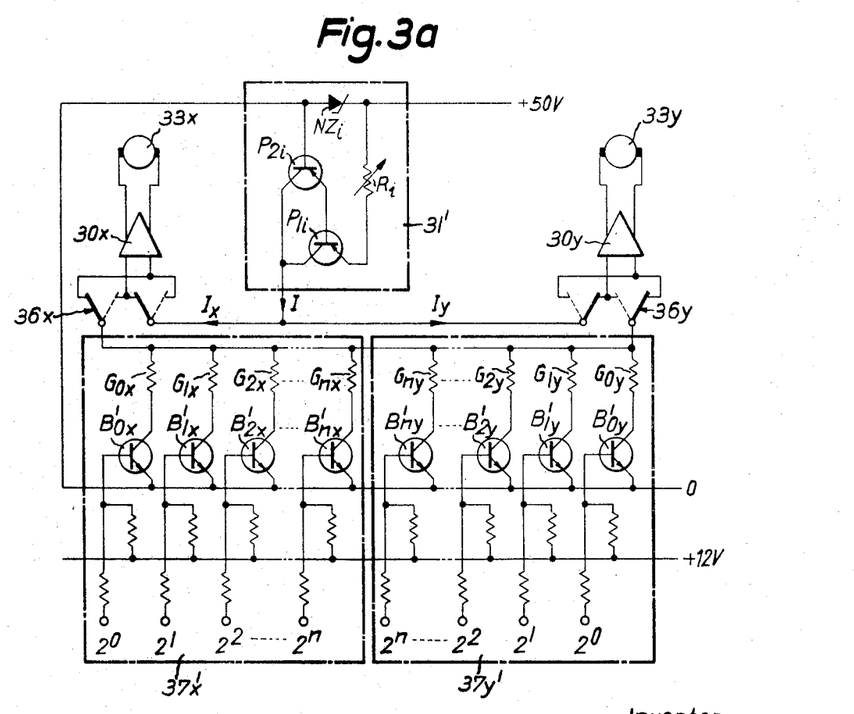
FIGURE 3a is a circuit diagram of a modified version of the arrangement of FIGURE 3.

Referring now to FIGURE 3a, there is shown a modified version of the arrangement of FIGURE 3 wherein the switches B of the D-A converters are replaced by contact-free switches constituted by transistors $B'_{0x}$, $B'_{1x}$, $B'_{2x}$, ... $B'_{nx}$ and $B'_{0y}$, $B'_{1y}$, $B'_{2y}$, ... $B'_{ny}$.

Each of the converters $37x'$ and $37y'$ is further provided with a plurality of resistors $G_{0x}$, $G_{1x}$, $G_{2x}$, ... $G_x$, and $G_{0y}$, $G_{1y}$, $G_{2y}$, ... $G_{ny}$, respectively. The conduction values of the resistors of each group bear the same relation to each other as the similarly identified resistors shown in FIGURE 3, with the conductance value of each resistor being twice as great as that of the immediately preceding resistor. Each of the resistors is associated with a respective bit location of the digital position deviation signal to which it relates, and the conduction state of each of the transistors B' is controlled by the value of the deviation signal bit with which it is associated and which is applied to its base, with each transistor being rendered blocking when its associated bit has a value of zero and being rendered conductive when its associated bit has a value of L (one). As a result, the transition of each digital deviation signal from a maximum value to zero will cause successive ones of the group of transistors B' with which it is associated to become non-conducting so as to increase the effective resistance which the associated D-A converter presents to the circuit.

The arrangement of FIGURE 3a further includes a current source $31'$ composed essentially of a cascade arrangement of transistors $P_{1i}$ and $P_{2i}$, and a series arrangement of a Zeneor diode $NZ_i$, and a resistor $R_i$ connected between the emitter of transistor $P_{1i}$ and the base of transistor $P_{2i}$. A power supply voltage is applied to the junction between Zener diode $NZ_i$ and resistor $R_i$.

Transistor $P_{1i}$ is controlled by transistor $P_{2i}$ in such a manner as to maintain the current I in the collector circuit of the latter at a constant value. As the effective resistances of converters $37x'$ and $37y'$ increase, the voltage at the base of control transistor $P_{2i}$ also increases until it reaches a value sufficient to drive Zener diode $NZ_i$ into its reverse breakdown region, after which the voltage at the base of transistor $P_{2i}$ will be prevented from increasing further.

From this moment on, the voltage across the supply $31'$ will remain substantially constant during further increases in the effective resistances of converters $37x'$ and $37y'$. Then, further increases in the values of these resistances will cause the amplitude of the current I to decrease in the manner described above in connection with FIGURE 3.

The amplitude of the constant current produced by supply $31'$ is a function of the resistance value of resistor $R_i$. In arrangements where the maximum current value is to be controlled by a digital signal, the resistor $R_i$ may be constructed so as to have a digitally controlled variable value. This may be accomplished, for example, by constituting the resistor $R_i$ of a plurality of parallel connected resistors having successively increasing resistance values, with each resistor being provided with a transistor switch for selectively switching the resistor into or out of the parallel circuit. Such an arrangement may have exactly the same form as that shown in connection with either of the converters $37x'$ and $37y'$ and permits the effective resistance value of the resistor $R_i$ to be directly controlled by digital information stored on the information storage medium, thereby permitting the constant current I to be given an optimum value for each portion of the travel path of the movable element.

The arrangement of FIGURE 3a is also preferably provided with saturation current preventing circuits of the type shown in FIGURE 3.

In order to cause arrangements according to the present invention to drive the movable element in an optimum manner over its entire travel path, it is necessary to give the signal variations applied to the feedback amplifiers an optimum characteristic during the period after which the power supply output begins to decrease sharply. It has been found that a particularly advantageous operation is achieved when this characteristic has a substantially parabolic form. This may be achieved, for example, by providing additional circuitry for causing the common input to the two D-A converters to vary in a parabolic manner during this period. This will cause the outputs of the two feed back circuit amplifiers to vary simultaneously in a parabolic manner, thus preserving the desired speed ratio between the two servo motors.

Figure 4:
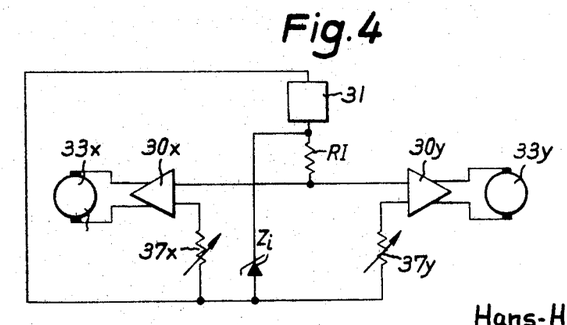
FIGURE 4 is a simplified block diagram of another embodiment of the present invention.

Referring now to FIGURE 4, there is shown a portion of one arrangement according to the present invention, which is similar to that of FIGURE 3, which is modified so as to give an approximately parabolic characteristic to the variations in the currents supplied by D-A converters 37x and 37y, and thus to give a similar characteristic to the speed variations of motors 33x and 33y during the time intervals after the voltage across supply 31 has reached its maximum value.

For the sake of clarity, only those elements are shown in FIGURE 4 which are required for producing this modified result, it being understood that the circuit represented by FIGURE 4 contains all of the elements shown in FIGURE 3.

In order to create the desired parabolic characteristic, a series resistance RI is provided between power supply 31 and the common terminal joining the inputs to the two amplifiers 30x and 30y. Accordingly, the entire generator current I flows through this resistor. However, as long as the output current from generator 31 remains constant, additional resistor RI will have no effect on the current level and hence on the operation of the system.

There is also provided a Zener diode $Z_1$ across the outputs of power supply 31. When the voltage across the function generator reaches a value sufficient to drive diode $Z_1$ into its reverse breakdown region which occurs when the voltage reaches its maximum predetermined value, the voltage drop across the resistor RI will produce an additional decrease in the level of the current being supplied to the D-A converters 37x and 37y. The current through these currents will then have the form:

$$I = \frac{V_{max}}{\frac{1}{\Sigma G_n} + \frac{1}{G_z}}$$

where $G_n$ represents the total conductance of the converters and $G_z$ represents the conductance of resistor RI. It may readily be shown that the curve of this equation, and hence the motor speed variations produced over this range, has a configuration which is sufficiently parabolic to satisfy the requirements of such a system.

Figure 4A:
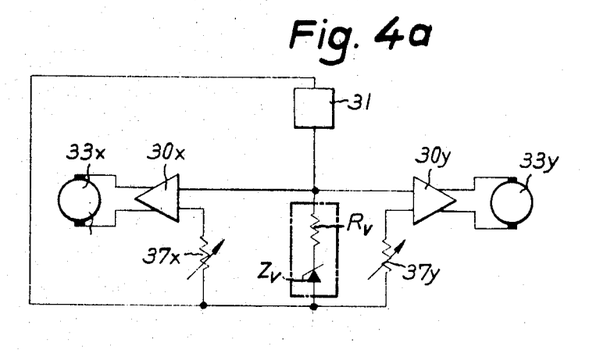
FIGURE 4a is a diagram of another arrangement similar to that of FIGURE 4.

A similar result may be achieved by replacing the resistance RI and Zener diode $Z_1$ by a series arrangement of a resistance RV and a Zener diode $Z_v$ across the outputs of supply 31, as is shown in FIGURE 4a. When this arrangement is employed, the resistor RV will be substantially non-conductive as long as Zener diode $Z_v$ is non-conducting. However, when the voltage across the Zener diode reaches its reverse breakdown value, a portion of the power supply current output will flow through resistor RV and hence will bypass the converters 37x and 37y.

It may thus be seen that arrangements according to the present invention permit a movable element to be driven over a distance whose digital value contains substantially more bits than the bit locations contained in each D-A converter without requiring auxiliary operations to be carried out within the system in order to obtain intermediate digital position values.

The present invention also permits a control to be effected wherein a speed regulation automatically changes into a position regulation when the driven element approaches a position corresponding to a programmed nominal position value, thus assuring a precise positioning of the element at a position corresponding to the nominal value. During the speed regulation phase of this operation, the driving units, such servo motors for example, operate at maximum speed.

It has been found that the cost of systems according to the present invention is substantially lower than that of comparable prior art systems.

It should be appreciated that the present invention is not limited to two coordinate systems but may be employed in the construction of single coordinate systems as well as three coordinate systems. Moreover, although the embodiments of the present invention have been described with particular reference to the positioning of a machine tool, the present invention is not limited to this field of use.

As has been mentioned above, control systems according to the present invention are particularly well suited for carrying out position regulation operations, in accordance with programmed digital information, in which a movable element, such as a machine tool, is transported simultaneously with respect to at least two coordinate axes. However, the present invention is equally well suited for other applications, and particularly those in which a plurality of speeds, such as those of driving motors for example, are to be regulated so as to maintain a constant ratio between them for a certain period of time and so as to then reduce these speeds progressively to zero after the period of time or after a specific number of motor revolutions, while maintaining the desired speed ratio.

Such an application occurs, for example, in the case of digitally controlled mixing operations. In such cases digital signals are provided which represent the proportions of the ingredients to be mixed, these digital signals being compared with other digital signals representing the amount of each ingredient which has already been delivered to a mixing chamber. These latter digital signals may be generated by suitable units which are operated by rotating flow meters.

In these systems, digital deviation signals are produced and are converted into analog form, the resulting analog values then being applied to drive the feeding motors so as to maintain the ratio between the flow rates at a constant, predetermined value.

When these digital deviation signals subsequently reach a predetermined value which causes the outputs from the D-A converters to decrease sharply, new nominal digital values may be fed in, if it is desired to continue the mixing operation. On the other hand, if it is desired to terminate the mixing operation after the previously inserted nominal digital values have been attained, the decrease in the outputs from the D-A converters acts to decrease the signals applied to suitable analog feedback control systems in such a manner as to reduce the rates of rotation of the motors in such a manner as to maintain the feeding ratio between the motors constant. This continues until the desired quantities have been introduced into the mixing chamber, at which time the operation ceases.

When it is desired to feed successive digital values into the system, this can be accomplished simply by providing an endless punched tape on which the digital signals are stored.

A particularly simple unit for providing a digital output representing the actual quantity of each ingredient which has already been delivered may be constituted by an angular coder which is rotated by the flow meter and which is provided with a binary coded screen disc of the type which may be read optically or electrically, for example. The angular position of this screen disc may be preset to the desired quantity of the ingredient to be introduced, and may be arranged to be rotated by the flow meter in such a direction that it will reach its zero digital position when the desired quantity of the ingredient has flowed past the meter. When such an arrangement is used, the instantaneous position of the screen disc will at each instant represent the deviation between the quantity of the ingredient which has already flowed and the total quantity which it is desired to deliver to a mixing chamber. When the angular coder provides such as indication, it is unnecessary to provide a subtracting arithmetic unit of the type shown in FIGURE 1 for comparing the reading of the disc with the programmed input signals $s_1$ and the coder output may be directly connected to the digital inputs of the associated D-A converters. Such arrangements can be used to control the mixing of any number of ingredients.

In systems in which the motors are used to drive fluid pumps, such as gear pumps or impeller pumps for example, which deliver a constant quantity of the ingredient for each revolution of the driving motor, the system may be structurally simplified by simply connecting the angular coders with the driving motor outputs.

In addition to the particular applications mentioned above, it should also be appreciated that control systems according to the present invention may also be employed for controlling other operations wherein the ratio between a plurality of quantities is to be maintained at a constant value. One such additional application of the present invention, for example, may be in the regulation of the speed ratios between a plurality of motors in a multimotor drive.

It will be understood that the above description of the present invention is susceptible to various modifications, changes, and adaptations, and the same are intended to be comprehended within the meaning and range of equivalents of the appended claims.

What is claimed is:

1. A hybrid ratio regulating system for controlling the condition of at least one controlled member driven by an analog feedback control circuit in accordance with a digital deviation signal representing the difference between the actual condition of such member and the desired condition to which such member is to be driven, said system comprising, in combination:
   (a) one digital-analog converter for each such controlled member, said converter having an analog output for connection to the reference input of the feedback control circuit, a digital input for receiving the digital deviation signal, and an analog power input, said converter having between said analog power input and said analog output a transfer function whose value is proportional to the value of such digital deviation signal, and
   (b) power supply means connected to said analog power input for supplying a power signal thereto having a first and a second parameter, said power supply means including function generator means for causing said second parameter to vary in proportion to variations of said converter transfer function and, said first parameter to bear a first functional relationship to said transfer function until said transfer function has reached a predetermined value as a result of such digital deviation signal having decreased to a corresponding predetermined level, and said first parameter to thereafter decrease in proportion to further decreases in the value of such digital signal.

2. An arrangement as defined in claim 1 wherein there are provided two such digital-analog converters, each for controlling the condition of a separate controlled member, said converters having their said analog power inputs connected together across said power supply means.

3. An arrangement as defined in claim 1 wherein said power supply means comprises control means for varying said predetermined value of said first parameter.

4. An arrangement as defined in claim 3 further comprising one analog feedback control circuit for each said converter, said control circuit including an amplifier having an input connected to said converter analog output and having a transfer function such that its output will become saturated when the signal applied to its input exceeds a predetermined level, and wherein said converter control means are arranged for reducing said first parameter to a value which is sufficiently low to prevent said amplifier output from becoming saturated.

5. An arrangement as defined in claim 4 wherein said converter control means reduce the value of said first parameter to a level sufficiently high to vary such condition of such controlled member at a maximum rate as long as such digital deviation signal remains above said level corresponding to said predetermined value of said transfer function.

6. An arrangement as defined in claim 5 wherein said function generator means act to vary said first parameter in an approximately parabolic manner with respect to decreases in the value of such digital signal after said transfer function has reached said predetermined value.

7. An arrangement as defined in claim 1 wherein said function generator means causes said first parameter to remain substantially constant until said transfer function has reached said predetermined value.

8. An arrangement as defined in claim 7 wherein said function generator means maintains said second parameter substantially constant after such digital deviation signal has decreased to said predetermined level.

9. An arrangement as defined in claim 1 wherein there are provided two digital-analog converters having their said analog power inputs connected together in series, each said converter comprising a plurality of serially connected resistors each associated with a respective bit location of such digital deviation signal and each having a resistance value proportional to the weighting of the bit location with which it is associated, and a plurality of short-circuiting switches each connected across a respective one of said resistors and each arranged to be operated according to the value of the bit associated with its respective resistor, the transfer function of each said converter being constituted by the effective series resistance presented by said plurality of resistors and thus being proportional to the value of such digital deviation signal, and said analog output of each said converter is connected across said plurality of resistances for providing an analog output voltage which is equal to the voltage appearing across said resistors, and wherein said power supply means is connected across the series arrangement of said power inputs for supplying a power signal whose voltage constitutes said first parameter and whose current constitutes said second parameter, said function generator means operating to cause the voltage applied by said power supply means to remain constant until the current delivered through said plurality of resistances of said two converters reaches a predetermined value, and to then cause said current to vary in such a manner as to cause said voltage to progressively decrease.

10. An arrangement as defined in claim 9 wherein said function generator means acts to maintain said current at an approximately constant level after it has reached said predetermined value.

11. An arrangement as defined in claim 1 wherein there are provided two digital-analog converters having their said analog power inputs connected together in parallel across the output of said power supply means, each said converter including a plurality of resistors and switches, with each said switch being connected in series with a respective one of said resistors and all of the resulting resistor-switch series combinations being connected together in parallel, each of said resistor-switch series combinations being associated with a respective bit of an associated digital deviation signal, each said resistance having a conductance value proportional to the weighting of the bit location with which it is associated, and each said switch being operated in accordance with the value of the bit appearing in its respective bit location, whereby the total parallel conductance of said resistors is proportional to the value of the digital deviation signal associated with said converter, and wherein said power supply means provides a power signal whose current constitutes said first parameter and whose voltage constitutes said second parameter, and said function generator means acts to maintain the value of said current at least approximately constant until said voltage reaches a predetermined value and to cause said current to decrease thereafter.

12. An arrangement as defined in claim 11 wherein said function generator means causes the value of said voltage to remain substantially constant after it reaches said predetermined value.

13. An arrangement as defined in claim 11 further comprising: one current amplifier for each said converter, each said amplifier having its input connected to said analog output of said converter in series with its said parallel connected resistors, whereby the total current through said converter flows through said amplifier input, each said amplifier having a maximum permissible current output and having an input resistance which increases when said maximum current output is obtained; and amplifier current monitoring means having an input connected to said input of each said amplifier and an output connected to control said power supply means for causing the current supplied by said power supply means to be maintained at a level which is sufficent to prevent said output currents from said amplifiers from exceeding said maximum permissible values.

14. An arrangement as defined in claim 1 further comprising digital data supply means connected to said power supply means for regulating the value assumed by said first parameter in accordance with a predetermined program during the interval before said transfer function has reached said predetermined value.

References Cited

UNITED STATES PATENTS

| | | |
|---|---|---|
| 3,084,315 | 4/1963 | Coady-Farley et al. 318—162 X |
| 3,139,570 | 6/1964 | Jacobson et al. _ _ _ _ 318—162 X |
| 3,175,138 | 3/1965 | Kilroy et al. _ _ _ _ _ _ 318—162 X |
| 3,206,663 | 9/1965 | Neal et al. _ _ _ _ _ _ _ _ _ _ _ 318—28 |
| 3,221,326 | 11/1965 | Lawhon _ _ _ _ _ _ _ _ _ _ _ _ 340—347 |
| 3,264,947 | 8/1966 | Bidlack. |
| 3,314,603 | 4/1967 | Jones et al. |
| 3,399,335 | 8/1968 | Prapis et al. _ _ _ _ _ _ _ _ _ 323—9 X |

THOMAS A. ROBINSON, Primary Examiner

M. K. WOLENSKY, Assistant Examiner

U.S. Cl. X.R.

318—18